United States Patent
Kim et al.

(10) Patent No.: US 12,191,476 B2
(45) Date of Patent: *Jan. 7, 2025

(54) SOLID ELECTROLYTE, METHOD FOR PREPARING SAME, AND ALL-SOLID-STATE BATTERY INCLUDING SAME

(71) Applicant: LG ENERGY SOLUTION, LTD., Seoul (KR)

(72) Inventors: Daeil Kim, Daejeon (KR); Jonghyun Chae, Daejeon (KR); Suhwan Kim, Daejeon (KR); Sung Chul Lim, Daejeon (KR); Jihoon Ahn, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1027 days.

This patent is subject to a terminal disclaimer.

(21) Appl. No.: 17/042,805

(22) PCT Filed: Aug. 22, 2019

(86) PCT No.: PCT/KR2019/010669
§ 371 (c)(1),
(2) Date: Sep. 28, 2020

(87) PCT Pub. No.: WO2020/045893
PCT Pub. Date: Mar. 5, 2020

(65) Prior Publication Data
US 2021/0028439 A1 Jan. 28, 2021

(30) Foreign Application Priority Data

Aug. 31, 2018 (KR) .................. 10-2018-0103396
Aug. 19, 2019 (KR) .................. 10-2019-0100981

(51) Int. Cl.
*H01M 4/131* (2010.01)
*C08F 290/14* (2006.01)
*H01M 4/04* (2006.01)
*H01M 4/134* (2010.01)
*H01M 4/36* (2006.01)
*H01M 10/0525* (2010.01)
*H01M 10/0565* (2010.01)
*H01M 50/411* (2021.01)
*H01M 50/417* (2021.01)
*C08F 12/14* (2006.01)
*C08F 20/14* (2006.01)

(52) U.S. Cl.
CPC .......... *H01M 4/131* (2013.01); *C08F 290/141* (2013.01); *H01M 4/0471* (2013.01); *H01M 4/134* (2013.01); *H01M 4/364* (2013.01); *H01M 10/0525* (2013.01); *H01M 10/0565* (2013.01); *H01M 50/411* (2021.01); *H01M 50/417* (2021.01); *C08F 12/14* (2013.01); *C08F 20/14* (2013.01); *H01M 2300/004* (2013.01); *H01M 2300/0071* (2013.01); *H01M 2300/0082* (2013.01)

(58) Field of Classification Search
CPC ..... H01M 2300/0082; H01M 10/0565; H01M 2300/0065; H01M 50/411; H01M 50/417; H01M 10/0525; C08F 290/141; C08F 12/14; C08F 20/14
See application file for complete search history.

(56) References Cited

U.S. PATENT DOCUMENTS

| | | | | |
|---|---|---|---|---|
| 4,670,363 A * | 6/1987 | Whitney | ........... | H01M 10/0567 429/327 |
| 5,455,127 A | 10/1995 | Olsen et al. | | |
| 11,870,033 B2 * | 1/2024 | Kim | ........... | H01M 10/42 |
| 2002/0045101 A1 * | 4/2002 | Hwang | ............ | H01M 10/052 429/231.95 |
| 2008/0241699 A1 | 10/2008 | Halalay | | |
| 2009/0136440 A1 | 5/2009 | Maas et al. | | |
| 2009/0325076 A1 * | 12/2009 | Matsui | ............ | H01M 10/0569 429/326 |
| 2010/0221614 A1 | 9/2010 | Bertin et al. | | |
| 2013/0157144 A1 | 6/2013 | Wang et al. | | |
| 2013/0295466 A1 * | 11/2013 | Kwon | ............ | H01M 10/0565 429/316 |

(Continued)

FOREIGN PATENT DOCUMENTS

CN 103165936 A 6/2013
CN 103985899 A 8/2014

(Continued)

OTHER PUBLICATIONS

International Search Report for PCT/KR2019/010669 (PCT/ISA/210) mailed on Dec. 2, 2019.

(Continued)

*Primary Examiner* — Jeremiah R Smith
(74) *Attorney, Agent, or Firm* — Birch, Stewart, Kolasch & Birch, LLP (57) ABSTRACT

A solid polymer electrolyte and a method for preparing the solid polymer electrolyte are disclosed. More particularly, a solid polymer electrolyte including a multifunctional acrylate-based polymer, a C1 to C10 polyalkylene oxide, a flame-retardant polymer, a lithium salt, and a non-aqueous solvent, wherein the multifunctional acrylate-based polymer is cross-linked with the polyalkylene oxide to form semi-interpenetrating polymer networks (semi-IPN), and the flame-retardant polymer is present blended with the semi-interpenetrating polymer networks of the multifunctional acrylate-based polymer and the polyalkylene oxide, which shows high solid content and flame-retardant characteristics, and a method for preparing the same.

17 Claims, 3 Drawing Sheets

(56) References Cited

U.S. PATENT DOCUMENTS

| | | | |
|---|---|---|---|
| 2016/0087306 A1 | 3/2016 | Lee et al. | |
| 2017/0247539 A1 | 8/2017 | Chen et al. | |
| 2017/0338471 A1* | 11/2017 | Zheng | H01M 4/5825 |
| 2018/0034058 A1* | 2/2018 | Suh | H01M 4/587 |
| 2019/0252722 A1* | 8/2019 | Mendez Agudelo | H01M 4/525 |
| 2021/0066751 A1 | 3/2021 | Kim et al. | |
| 2021/0083291 A1 | 3/2021 | Lee et al. | |

FOREIGN PATENT DOCUMENTS

| | | | | |
|---|---|---|---|---|
| CN | 104919632 A | * | 9/2015 | H01M 10/4235 |
| CN | 107293790 A | | 10/2017 | |
| CN | 107883555 A | | 3/2018 | |
| CN | 111670515 A | | 11/2024 | |
| EP | 3723179 A1 | | 10/2020 | |
| JP | 11-176472 A | | 7/1999 | |
| JP | 2002-110147 A | | 4/2002 | |
| JP | 2006-134736 A | | 5/2006 | |
| JP | 2009-149860 A | | 7/2009 | |
| JP | 2009-531820 A | | 9/2009 | |
| JP | 2018-62895 A | | 4/2016 | |
| JP | 2017-199678 A | | 11/2017 | |
| KR | 10-2008-0088489 A | | 10/2008 | |
| KR | 20140145450 A | * | 12/2014 | H01M 10/056 |
| KR | 10-2016-0034173 A | | 3/2016 | |
| KR | 10-2017-0050278 A | | 5/2017 | |
| KR | 10-2017-0050561 A | | 5/2017 | |
| KR | 10-2017-0074841 A | | 6/2017 | |

OTHER PUBLICATIONS

Zeng et al., "Reshaping Lithium Plating/Stripping Behavior via Bifunctional Polymer Electrolyte for Room-Temperature Solid Li Metal Batteries", Journal of the American Chemical Society, Nov. 30, 2016, Downloaded from http://pubs.acs.org on Dec. 1, 2016, total of 5 pages.

Extended European Search Report, dated May 27, 2021, for European Application No. 19856199.5.

* cited by examiner

| | Before Burning | After Burning | Rate |
|---|---|---|---|
| Comparative Example |  |  | X |
| Example 1 |  |  | ○ |
| Example 3 |  |  | ○ |
| Example 6 |  |  | ○ |

【Figure 4】

SOLID ELECTROLYTE, METHOD FOR PREPARING SAME, AND ALL-SOLID-STATE BATTERY INCLUDING SAME

TECHNICAL FIELD

The present application claims the benefits of priorities based on Korean Patent Application No. 10-2018-0103396 filed on Aug. 31, 2018 and Korean Patent Application No. 10-2019-0100981 filed on Aug. 19, 2019, all the contents of which are incorporated herein by reference.

The present invention relates to a solid electrolyte, a preparation method thereof, and an all solid-state battery including the same.

BACKGROUND ART

Currently, the lithium ion secondary battery having a high energy density mainly used in notebooks and smartphones is composed of a positive electrode made of lithium oxide, a carbon-based negative electrode, a separator, and an electrolyte. Conventionally, an ion conductive organic liquid electrolyte in which salts are dissolved in a liquid electrolyte, particularly a non-aqueous organic solvent, has been mainly used as the electrolyte. However, if a liquid electrolyte as described above is used, not only is there a high possibility that the electrode material is degraded and the organic solvent is volatilized, but there is also a problem in safety due to combustion caused by an increase in the ambient temperature and the temperature of the battery itself. In particular, the lithium secondary battery has a problem that during charging and discharging, gas is generated inside the battery due to decomposition of the organic solvent and/or side reaction between the organic solvent and the electrode, thereby expanding the thickness of the battery, and during the storage at high temperature, this reaction is accelerated and the amount of gas generated is further increased.

The gas thus generated continuously causes an increase in the internal pressure of the battery, which causes the rectangular battery to swell in a specific direction and to explode, or which deforms the center of a specific surface of the battery, thereby leading to a decrease in safety, and also which causes a local difference in adhesion at the electrode surface of the battery, thereby leading to a disadvantage that the electrode reaction does not occur identically in the entire electrode surface, and thus degrading the performance of the battery.

Therefore, research into the polymer electrolyte for lithium secondary batteries to solve this problem of liquid electrolyte and to replace it has been actively conducted until recently.

Polymer electrolytes are largely divided into gel and solid types. Gel-type polymer electrolyte is an electrolyte that shows conductivity by impregnating a high-boiling liquid electrolyte in a polymer film and fixing it with lithium salt. Solid-type polymer electrolyte is a form in which dissociated lithium cations move in the polymer by adding lithium salt to a polymer containing hetero elements such as O, N, and S.

Gel-type polymer electrolyte contains a large amount of liquid electrolyte, and thus has ion conductivity similar to that of pure liquid electrolyte. However, there are disadvantages that the stability problem and the difficulty of the manufacturing process of the battery remain as they are.

On the other hand, in the case of solid polymer electrolytes, it does not contain liquid electrolyte, which improves the stability problem related to leakage and also has the advantage of high chemical and electrochemical stability. However, since the ion conductivity at room temperature is very low, a lot of research has been conducted to improve this.

Currently, the most commonly used material for the solid polymer electrolyte is polyethylene oxide (PEO), which has the ability to conduct ions despite being solid. However, in the case of the linear PEO-based polymer electrolyte, since the conductivity was very low as $10^{-5}$ S/cm at room temperature due to high crystallinity, it was difficult to apply to the lithium secondary battery. In addition, the processability of the electrolyte is poor, the mechanical strength is insufficient, low voltage stability of less than 5 V appears and so on, and thus it is difficult to realize satisfactory performance by applying this to a battery.

In order to solve these problems, attempts have been made to develop a variety of materials such as mixed polymer electrolytes, interpenetrating network polymer electrolytes, and nonwoven solid polymer electrolytes. However, there are still problems with low ion conductivity, mechanical strength, and a narrow operating voltage range.

Therefore, the solid polymer electrolytes must have a high ion conductivity, adequate mechanical strength, and a wide operating voltage range, while having flame-retardant characteristics to ensure operation stability of the batteries, and also need to contain a minimum amount of solvent to apply them to all solid-state batteries.

PRIOR ART DOCUMENT

Patent Document (Patent Document 1) Japanese Laid-open Patent Publication No. 2006-134736 (2006 May 25), "Gel electrolyte for polymer battery and polymer battery having same"

DISCLOSURE

Technical Problem

Therefore, as a result of various studies to solve the above problems, the inventors of the present invention have confirmed that if the solid polymer electrolyte is prepared by cross-linking multifunctional acrylate-based polymers with C1 to C10 polyalkylene oxides to form semi-interpenetrating polymer networks (semi-IPN) and then adding a flame-retardant polymer, a lithium salt, and a non-aqueous solvent, since the electrolyte has an improved ion conductivity, shows a flame-retardant effect, and shows a high solid content, it can be effectively applied to the all solid-state battery, and thus have completed the present invention.

Accordingly, it is an object of the present invention to provide a flame-retardant solid polymer electrolyte applicable to an all solid-state battery, and to provide an all solid-state battery with improved performance comprising the same.

Technical Solution

In order to achieve the above object, the present invention provides a solid polymer electrolyte comprising a multifunctional acrylate-based polymer, a C1 to C10 polyalkylene oxide, a flame-retardant polymer, a lithium salt, and a non-aqueous solvent, wherein the multifunctional acrylate-based polymer is cross-linked with the polyalkylene oxide to form semi-interpenetrating polymer networks (semi-IPN), and the flame-retardant polymer is present_blended with semi-interpenetrating polymer networks.

In one embodiment of the present invention, the C1 to C10 polyalkylene oxide is present in an amount of 0.1 part by weight to 10 parts by weight relative to 100 parts by weight of the multifunctional acrylate-based polymers.

In one embodiment of the present invention, a weight average molecular weight of the C1 to C10 polyalkylene oxide is 1,000 g/mol to 1,000,000 g/mol.

In one embodiment of the present invention, the multifunctional acrylate-based polymer comprises at least one monomer-derived polymerized unit selected from the group consisting of trimethylolpropane ethoxylate triacrylate, trimethylolpropane propoxylate triacrylate, polyethylene glycol dimethacrylate, polyethylene glycol diacrylate, polyester dimethacrylate, trimethylolpropane trimethacrylate, ethoxylated bis phenol A dimethacrylate, tetraethylene glycol diacrylate, 1,4-butanediol diacrylate, 1,6-hexandiol diacrylate, ditrimethylolpropane tetraacrylate, pentaerythritol tetraacrylate, pentaerythritol ethoxylate tetraacrylate, dipentaerythritol pentaacrylate, and dipentaerythritol hexaacrylate.

In one embodiment of the present invention, the C1 to C10 polyalkylene oxide comprises at least one one selected from the group consisting of polyethylene oxide, and polypropylene oxide.

In one embodiment of the present invention, the solid polymer electrolyte contains 25 wt. % to 40 wt. % of the semi-interpenetrating polymer networks, based on a total weight of the solid polymer electrolyte.

In one embodiment of the present invention, the lithium salt comprises at least one selected from the group consisting of $LiPF_6$, $LiBF_4$, $LiSbF_6$, $LiAsF_6$, LiOH, $LiOH·H_2O$, LiBOB, $LiClO_4$, $LIN(C_2F_5SO_2)_2$, $LIN(CF_3SO_2)_2$, $CF_3SO_3Li$, $LiC(CF_3SO_2)_3$, $LiC_4BO_8$, LiTFSI, and LiFSI.

In one embodiment of the present invention, the lithium salt is present in an amount of 10 parts by weight to 50 parts by weight relative to 100 parts by weight of the solid polymer electrolyte.

In one embodiment of the present invention, the lithium salt is present in a concentration of 0.5 M to 2.5 M with respect to the non-aqueous solvent.

In one embodiment of the present invention, the non-aqueous solvent comprises at least_one selected from the group consisting of dimethyl sulfone, sulforane, and triethylene glycol dimethyl ether (TEGDME).

In one embodiment of the present invention, a thickness of the solid polymer electrolyte is 10 μm to 300 μm.

In one embodiment of the present invention, an ion conductivity of the solid polymer electrolyte is $1.0×10^{-5}$ S/cm to $1.0×10^{-3}$ S/cm based on 25° C.

In one embodiment of the present invention, the flame-retardant polymer comprises at least one selected from the group consisting of polyphosphonate, polyphosphonate oligomer, poly(phosphonate-co-carbonate), and poly(phosphonate-co-carbonate) oligomer.

In one embodiment of the present invention, 50% by weight or more of solids of the solid polymer electrolyte comprises the multifunctional acrylate-based polymer, the C1 to C10 polyalkylene oxide, the flame-retardant polymer, the lithium salt, and the non-aqueous solvent, based on a total weight of the electrolyte.

In one embodiment of the present invention, 50 wt. % to 70 wt. % of solids of the solid polymer electrolyte comprises the multifunctional acrylate-based polymer, the C1 to C10 polyalkylene oxide, the flame-retardant polymer, the lithium salt, and the non-aqueous solvent, based on a total weight of the electrolyte.

In one embodiment of the present invention, the lithium salt is present in a concentration of 0.5 M to 1.5 M with respect to the non-aqueous solvent, while containing 50 wt. % to 70 wt. % of the solids.

In addition, the present invention provides a method for preparing the solid polymer electrolyte for the secondary battery described above, comprising the steps of:
(1) mixing an electrolyte composition containing the multifunctional acrylate-based polymer monomer, the C1 to C10 polyalkylene oxide, the flame-retardant polymer, the lithium salt, and the non-aqueous solvent;
(2) melting the mixed electrolyte composition at a temperature of 100° C. to 150° C.; and
(3) photo-polymerizing the molten electrolyte composition to obtain the solid polymer electrolyte.

In one embodiment of the present invention, at least one photo-initiator selected from the group consisting of 2,2-dimethoxy-2-phenylacetonephenone (DMPA), 2-hydroxy-2-methylpropiophenone (HOMPP), lithium phenyl-2,4,6-trimethylbenzoylphosphinate (LAP), phenylbis(2,4,6-trimethylbenzoyl) phosphine oxide (IRGACURE 819), and 1-[4-(2-Hydroxyethoxy)-phenyl]-2-hydroxy-2-methyl-1-propane-1-one (IRGACURE 2959) is further added in step (1) of the above preparation method.

In addition, the present invention provides an all solid-state battery comprising the solid polymer electrolyte described above and an electrode.

Advantageous Effects

The solid polymer electrolyte according to the present invention improves the ion conductivity of the electrolyte and shows a flame-retardant effect. Also, due to the high content of the solids, it can be effectively applied to an all solid-state battery and has high mechanical stability and voltage stability.

BEST MODE

Hereinafter, the present invention will be described in detail with reference to the accompanying drawings so that those skilled in the art can easily carry out the present invention. However, the present invention can be embodied in various different forms, and is not limited thereto.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The terminology used herein is for the purpose of describing particular embodiments only and is not intended to be limiting of the present invention. The singular forms "a," "an," and "the" include plural referents unless the context clearly dictates otherwise. It is to be understood that the terms "comprise", or "have", etc., as used in the present specification, are intended to designate the presence of stated features, numbers, steps, operations, components, parts or combinations thereof, but not to preclude the possibility of the presence or addition of one or more other features, numbers, steps, operations, components, parts, or combinations thereof.

Solid Polymer Electrolyte

The present invention provides a solid polymer electrolyte comprising a multifunctional acrylate-based polymer, a C1 to C10 polyalkylene oxide, a flame-retardant polymer, a lithium salt, and a non-aqueous solvent, wherein the multifunctional acrylate-based polymer crosslinks with the polyalkylene oxide to form semi-interpenetrating polymer networks (semi-IPN), and the flame-retardant polymer is blended with the semi-interpenetrating polymer networks of the multifunctional acrylate-based polymer and the polyalkylene oxide, which shows high solid content and flame-retardant effect, and a method for preparing the same.

In the case of the polymer electrolyte to which the existing polyethylene oxide is applied, it has a limit of low ion conductivity because of the high crystallinity of the polymer structure. However, in the case of the polymer electrolyte according to one embodiment of the present invention, since the polymer formed by cross-linking the C1 to C10 polyalkylene oxide and the multifunctional acrylate-based polymer is applied, the crystallinity is lowered, thereby improving the fluidity of the polymer chain as well as increasing the dielectric constant of the polymer, and thus more lithium ions are dissociated and the ion conductivity is higher than that of the existing polyethylene oxide-based polymer. In addition, since the polymer formed by cross-linking the C1 to C10 polyalkylene oxide and the multifunctional acrylate-based polymer forms semi-interpenetrating polymer networks, the polymer electrolyte containing the polymer may exhibit excellent ion conductivity while improving stability and mechanical strength. The semi-interpenetrating polymer networks (semi-IPN) means that the linear and cross-linked polymers form a network structure. In these semi-interpenetrating polymer networks, two kinds of polymers are tied together in the shape of a chain and form a network structure. Therefore, these semi-interpenetrating polymer networks can have a stronger and tougher property than a general copolymer and exhibit excellent flexibility.

Specifically, the polyalkylene oxide may be C1 to C20 alkylene, or C1 to C10 alkylene, and may be, for example, any one selected from the group consisting of polyethylene oxide, polypropylene oxide, polybutylene oxide, or combinations thereof, and preferably may be polyethylene oxide.

The multifunctional acrylate-based polymer may be a compound having two or more double bonds at its terminals, and its non-limiting example may be any one monomer-derived polymerized unit selected from the group consisting of trimethylolpropane ethoxylate triacrylate, trimethylolpropane propoxylate triacrylate, polyethylene glycol dimethacrylate, polyethylene glycol diacrylate, polyester dimethacrylate, trimethylolpropane trimethacrylate, ethoxylated bis phenol A dimethacrylate, tetraethylene glycol diacrylate, 1,4-butanediol diacrylate, 1,6-hexandiol diacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, and combinations thereof. The monomer-derived polymerized unit is a part constituting the polymer, and means a part derived from a specific monomer in the polymer molecular structure. For example, an acrylonitrile-derived polymerized unit refers to a portion derived from acrylonitrile in the polymer molecular structure.

The weight average molecular weight of the polyalkylene oxide may be 1,000 to 1,000,000 g/mol. Specifically, it may be 1,000 to 600,000 g/mol, preferably 1,000 to 100,000 g/mol. In this case, it is possible to exhibit excellent ion conductivity within the above range. Within this range, the smaller the weight average molecular weight is, the better the fluidity of the polymer chain is and the higher the ion conductivity is.

In one embodiment of the present invention, the polyalkylene oxide may be contained in an amount of 0.1 to 10 parts by weight relative to 100 parts by weight of the multifunctional acrylate-based polymer. Specifically, the polyalkylene oxide may be contained in an amount of 1 to 10 parts by weight, preferably 2 to 10 parts by weight. Within this range, as the content of the polyalkylene oxide is increased, the ion transfer capacity of the semi-interpenetrating polymer networks may be improved.

In one embodiment of the present invention, the content of the semi-interpenetrating polymer networks formed by crosslinking the multifunctional acrylate-based polymer and the C1 to C10 polyalkylene oxide may be 25 to 40 wt. %, preferably 27 to 36 wt. %, more preferably, 27.4 to 35.8 wt. % relative to the total weight of the electrolyte. If the content of the semi-interpenetrating polymer networks is less than 25 wt. %, the mechanical strength of the solid polymer electrolyte is insufficient. If the content is more than 40 wt. %, the ion conductivity may be lowered. Accordingly, it is preferable that the content satisfies the above range.

Meanwhile, the solid polymer electrolyte may comprise a lithium salt. The lithium salt may act as a source of lithium ions in the battery to enable the basic operation of the lithium secondary battery, and serve to promote the movement of lithium ions between the positive electrode and the negative electrode. The lithium salt may be any one selected from the group consisting of $LiPF_6$, $LiBF_4$, $LiSbF_6$, $LiAsF_6$, LiOH, $LiOH·H_2O$, LiBOB, $LiClO_4$, LiN $(C_2F_5SO_2)_2$, LiN $(CF_3SO_2)_2$, $CF_3SO_3Li$, LiC $(CF_3SO_2)_3$, $LiC_4BO_8$, LiTFSI, LiFSI, $LiClO_4$, and combinations thereof, but is not limited thereto.

The content of the lithium salt may be 10 to 50 parts by weight, specifically 20 to 47 parts by weight, relative to 100 parts by weight of the electrolyte. If the lithium salt content is less than 10 parts by weight, the ion conductivity of the electrolyte may be lowered due to the low content. If the lithium salt content is 50 parts by weight or more, some lithium salts do not dissociate in the polymer electrolyte and exist in a crystalline state and thus do not contribute to the ion conductivity, but rather may interfere with ion conductivity, thereby reducing ion conductivity and relatively decreasing polymer content, and thus weakening the mechanical strength of the solid polymer electrolyte. Therefore, the content of lithium salt is appropriately adjusted in the above range.

The lithium salt may be a concentration of 0.5 to 2.5 M, preferably may be a concentration of 0.5 to 1.5 M, more preferably may be a concentration of 0.68 to 1.17 M with respect to the non-aqueous solvent according to one embodiment of the present invention to be described later. The lithium salt is added in an appropriate amount in terms of the relative relationship with the content of the non-aqueous solvent capable of ionizing lithium and the normal supply of lithium ions required for driving the battery. If the lithium salt is less than 0.5 M, the ion conductivity of the electrolyte may be reduced. If the lithium salt exceeds 2.5 M, the lithium salt is crystallized and may act as a resistance inside the battery. The lithium salt within the above range can allow further improved battery characteristics to be obtained.

The polymer electrolyte according to one embodiment may exhibit excellent ion conductivity. Specifically, the ion conductivity of the polymer electrolyte may be $1.0 \times 10^{-5}$ to $1.0 \times 10^{-3}$ S/cm based on 25° C.

In the case of an existing all solid-state battery, the non-aqueous solvent such as dimethylsulfoxide (DMSO) is commonly used, but the solvent such as dimethylsulfoxide has a problem in that it is difficult to give a flame-retardant property for securing the stability of the battery.

Therefore, in one embodiment of the present invention, the non-aqueous solvent may comprise any one selected from the group consisting of dimethyl sulfone, sulforane, triethylene glycol dimethyl ether (TEGDME), and combinations thereof. The non-aqueous solvent may be solid at room temperature (25° C.), and preferably may be dimethyl sulfone. As a non-limiting example, the dimethyl sulfone ($DMSO_2$, methylsulfonylmethane) or sulforane is a solid solvent at room temperature. Since the solid polymer electrolyte containing the solvent described above increases the solid content of the electrolyte, it can be easily applied to all solid-state batteries, and has the advantage of securing the stability of the battery by imparting flame-retardant characteristics. Table 1 below shows the characteristics of dimethyl sulfone ($DMSO_2$, methylsulfonylmethane) and sulforane, which are a kind of non-aqueous solvent according to the present invention.

TABLE 1

| Flame retardant solvent | Dielectric constant | $T_m$ (° C.) | $T_b$ (° C.) | Flash point (° C.) | NFPA 704-Flammability |
|---|---|---|---|---|---|
| ![D2 structure] D2 (Methylsulfonylmethane) | 47 | 109 | 248 | 143 | 1 |
| ![SL structure] SL (Sulfolane) | 44 | 28 | 287 | 177 | 1 |

In the above, the National Fire Protection Association (NFPA) is an index to evaluate the flame-retardant grade and biological safety and then to give a rate. Flame-retardant class 1 is a material with a flash point of 93.3 or higher, and flame-retardant class 0 is stone, concrete, sand, etc. Referring to Table 1 above, since dimethyl sulfone ($DMSO_2$, methylsulfonylmethane) and sulforane are solid at room temperature (25° C.), the electrolyte containing the solvent has the advantage of increasing the content of solids, and since the their flash points are 140 or more, they can give the flame-retardant properties of the electrolyte.

The non-aqueous solvent may be included in an amount of to 30 parts by weight, specifically 5 to 30 parts by weight, relative to 100 parts by weight of the electrolyte. If the amount of non-aqueous solvent is less than 1 part by weight, the preparing process may not be smooth, for example, uniform mixing of the electrolyte composition becomes difficult, and so on. If the amount of non-aqueous solvent is 30 parts by weight or more, the polymer content may be relatively decreased, so that the mechanical strength of the solid polymer electrolyte may be weakened. Therefore, the amount of non-aqueous solvent is properly adjusted in the range above.

The thickness of the electrolyte according to one embodiment of the present invention is preferably 10 to 300 μm. The thinner the thickness of the electrolyte is, the energy density can be improved. However, if the thickness is less than 10 μm, there is a problem that cannot secure the appropriate mechanical strength of the electrolyte. Therefore, the thickness is appropriately adjusted within the above range.

According to one embodiment of the present invention, the solid polymer electrolyte comprises a flame-retardant polymer to impart flame-retardant characteristics of the electrolyte itself, and the flame-retardant polymer may be blended with the semi-interpenetrating polymer networks of the multifunctional acrylate-based polymer and the polyalkylene oxide. The flame-retardant polymer prevents the all solid-state battery from burning well and prevents larger fires from occurring, even when the temperature of all solid-state battery rises sharply and ignites.

The flame-retardant polymer may be any one selected from the group consisting of polyphosphonate, polyphosphonate oligomer, poly(phosphonate-co-carbonate), poly(phosphonate-co-carbonate) oligomer, and combinations thereof. The flame-retardant polymer according to one embodiment of the present invention may be a polyphosphonate-based polymer represented by Formula 1 below:

[Formula 1]

wherein R is alkylene or arylene having 2 to 8 carbon atoms, n and m are each an integer of 1 to 100, and the polymer represented by Formula 1 has a weight average molecular weight of 40,000 to 100,000 (g/mol), and the glass transition temperature (Tg) may be 100 to 105° C.

The electrolyte according to one embodiment of the present invention may comprise at least 50% by weight, preferably 50 to 70% by weight, more preferably 54.0 to 61.6% by weight of the solids comprising the multifunctional acrylate-based polymer, the C1 to C10 polyalkylene oxide, the flame-retardant polymer, the lithium salt, and the non-aqueous solvent, based on the total weight of the electrolyte. If the content of the solids is less than 50% by weight, the mechanical strength is insufficient, and if the content of the solids is more than 70% by weight, the problem of decreasing the ion conductivity occurs. Therefore, it is preferable to satisfy the above range.

Since the solvents (e.g., dimethylsulfoxide: DMSO) commonly used in the preparation of the existing solid electrolytes exist in the liquid state at room temperature and there is a limit solubility of the electrolyte composition, there was a limit to increase solid content of electrolyte. However, in the case of including the non-aqueous solvent according to the present invention, since the solvent itself exists as a solid at room temperature, when preparing the electrolyte through the melting process, it is possible to increase the content of the solids than when using a conventional solvent, and preferably, the solids may be contained in an amount of 70% by weight or more.

If the content of the solids in the electrolyte is increased, the content of the solvent in the solid electrolyte is reduced, and thus there are advantages that the all solid-state battery containing the electrolyte at room temperature can exhibit a stable driving characteristics and that in the preparing process, less drying energy is used to remove the solvent, which reduces the process cost.

Method for Preparing Solid Polymer Electrolyte

In one embodiment of the present invention, there is provided a method for preparing the solid polymer electrolyte. The method for preparing the electrolyte is not particularly limited, and methods known in the art may be used.

The preparation method comprises: (1) mixing an electrolyte composition containing a multifunctional acrylate-based polymer monomer, a C1 to C10 polyalkylene oxide, a flame-retardant polymer, a lithium salt, and a non-aqueous solvent; (2) melting the electrolyte composition at 100 to 150° C.; and (3) photo-polymerizing the molten electrolyte composition to obtain the electrolyte. By the above method, the multifunctional acrylate-based polymer and the C1 to C10 polyalkylene oxide are cross-linked to form the semi-interpenetrating polymer networks (semi-IPN), and the flame-retardant polymer can be blended with the above semi-interpenetrating polymer networks to produce a solid polymer electrolyte.

The multifunctional acrylate-based polymer monomer may be a compound having two or more double bonds at its terminals, and specific examples thereof are as described above. In step (1), the polyalkylene oxide may be contained in an amount of 0.1 to 10 parts by weight relative to 100 parts by weight of the multifunctional acrylate-based polymer monomer. Specifically, the polyalkylene oxide may be contained in an amount of 1 to 10 parts by weight and 2 to 10 parts by weight. Within this range, as the content of the polyalkylene oxide is increased, the ion transfer capacity of the semi-interpenetrating polymer networks may be improved.

In this case, a photo-initiator may be further comprised, and at least one photo-initiator selected from the group consisting of 2,2-dimethoxy-2-phenylacetonephenone (DMPA), 2-hydroxy-2-methylpropiophenone (HOMPP), Lithium phenyl-2,4,6-trimethylbenzoylphosphinate (LAP), 1-[4-(2-Hydroxyethoxy)-phenyl]-2-hydroxy-2-methyl-1-propane-1-one (IRGACURE 2959) and phenylbis(2,4,6-trimethylbenzoyl) phosphine oxide (IRGACURE 819) may be comprised, and preferably, 2-hydroxy-2-methylpropiophenone (HOMPP) may be used, but is not limited thereto. The photo-initiator may form a radical by irradiation with ultraviolet rays. If the concentration of photo-initiator is too low, the photo-polymerization reaction does not proceed efficiently and the polymer electrolyte is incompletely formed. If the concentration of photo-initiator is too high, the photo-polymerization reaction proceeds too rapidly, resulting in poor uniformity of polymer electrolyte and limited application. Therefore, an appropriate amount of photo-initiator can be used depending on the desired physical properties of the electrolyte.

In the step of mixing the multifunctional acrylate-based polymer monomer and the C1 to C10 polyalkylene oxide, the lithium salt may be further added and mixed. In this case, the ion conductivity of the solid polymer electrolyte can be improved and the performance of the battery can be improved. The description for the lithium salt is as described above. The lithium salt may be added in an amount of 10 to 50 parts by weight, specifically 20 to 47 parts by weight, relative to 100 parts by weight of the multifunctional acrylate-based polymer monomer. In this case, a polymer electrolyte showing the excellent ion conductivity can be prepared.

Also, in step (1), the non-aqueous solvent can be further added and mixed. Since the non-aqueous solvent according to one embodiment of the present invention may be solid at room temperature, it may be uniformly mixed with the electrolyte composition through the melting process of step (2). The non-aqueous solvent may be added in an amount of 1 to 30 parts by weight, specifically 1 to 10 parts by weight, relative to 100 parts by weight of the multifunctional acrylate-based polymer monomer. In this case, a polymer electrolyte exhibiting the high content of the solids can be prepared.

Step (2) is a step of uniformly mixing the electrolyte composition, which may be a step of melting and stirring at a temperature of 100 to 150° C. If the temperature is less than 100° C., since the non-aqueous solvent included in the electrolyte composition is not melted, the composition may not be uniformly mixed. If the temperature exceeds 150° C., there is a problem that the prepared electrolyte cannot exhibit suitable physical properties for the battery. Therefore, the temperature is suitably adjusted within the said range. It is possible to prepare a uniform mixture by melting the electrolyte composition in the above temperature range and stirring for 12 to 24 hours. The stirring is not particularly limited, and methods known in the art may be used.

The step (3) of photo-polymerizing the uniformly mixed electrolyte composition to form the semi-interpenetrating polymer networks may be performed by irradiating ultraviolet rays (UV) to the electrolyte composition obtained in step (2). In this case, there is an advantage that the polymerization can be made in a very fast time. The ultraviolet rays irradiated to the electrolyte composition may be ultraviolet rays having a wavelength of 254 to 360 nm. The ultraviolet rays are light rays whose wavelengths are shorter than those of the violet visible rays and are abbreviated as UV (Ultraviolet rays). The ultraviolet rays are classified into ultraviolet rays A having a long wavelength (320 nm to 400 nm), ultraviolet rays B having a medium wavelength (280 nm to 300 nm), and ultraviolet rays C having a short wavelength (100 nm to 280 nm). When irradiating the ultraviolet rays to the electrolyte composition, the irradiation time period of the ultraviolet rays may be 5 to 30 minutes. However, depending on the intensity of the ultraviolet rays (UV) to be irradiated, the irradiation time of the ultraviolet rays (UV) may vary, and thus the irradiation time period of the ultraviolet rays (UV) is not limited to the above range.

All Solid-State Battery

In another one embodiment of the present invention, the present invention provides an all solid-state battery comprising the solid polymer electrolyte and an electrode.

The all solid-state battery proposed in the present invention defines the constitution of the solid polymer electrolyte as described above, and the other elements constituting the battery, that is, the positive electrode and the negative electrode, are not particularly limited in the present invention and follow the description below.

The negative electrode for the all solid-state battery is a lithium metal alone, or a negative electrode current collector laminated on the negative electrode active material.

In this case, the negative electrode active material may be any one selected from the group consisting of lithium metal, a lithium alloy, a lithium metal composite oxide, a lithium-containing titanium composite oxide (LTO), and a combination thereof. In this case, the lithium alloy may be an alloy of lithium and at least one metal selected from Na, K, Rb, Cs, Fr, Be, Mg, Ca, Sr, Ba, Ra, Al, and Sn. Also, the lithium metal composite oxide is an oxide ($MeO_x$) of lithium and any one metal (Me) selected from the group consisting of Si, Sn, Zn, Mg, Cd, Ce, Ni, and Fe and for example, may be $Li_xFe_2O_3$ ($0<x\leq1$) or $Li_xWO_2$ ($0<x\leq1$).

In addition, the negative electrode active material may be metal composite oxides such as $Sn_xMe_{1-x}Me'_yO_z$ (Me: Mn, Fe, Pb, Ge; Me': Al, B, P, Si, elements of groups 1, 2 and 3 of the periodic table, halogen; $0<x\leq1$; $1\leq y\leq3$; $1\leq z\leq8$); oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$, and carbon-based negative electrode active materials such as crystalline carbon, amorphous carbon, or carbon composite may be used alone or in combination of two or more.

In addition, the negative electrode current collector is not particularly limited as long as it has electrical conductivity without causing chemical changes in the all solid-state battery. For example, copper, stainless steel, aluminum, nickel, titanium, sintered carbon; copper or stainless steel whose surface is treated with carbon, nickel, titanium, silver or the like; aluminum-cadmium alloy or the like may be used as the negative electrode current collector. In addition, the shape of the negative electrode current collector can be various forms such as a film having fine irregularities on a surface, sheet, foil, net, porous body, foam, nonwoven fabric and the like, as with the positive electrode current collector.

The positive electrode for the all solid-state battery according to the present invention is not particularly limited and may be a material used for a known all solid-state battery.

If the electrode is a positive electrode, it is a positive electrode current collector; if the electrode is a negative electrode, it is a negative electrode current collector.

The positive electrode current collector is not particularly limited as long as it has high electrical conductivity without causing chemical changes in the relevant battery. For example, stainless steel, aluminum, nickel, titanium, sintered carbon, or aluminum or stainless steel whose surface is treated with carbon, nickel, titanium, silver or the like may be used.

The positive electrode active material can be varied depending on the use of the lithium secondary battery, and lithium transition metal oxides such as $LiNi_{0.8-x}Co_{0.2}Al_xO_2$, $LiCo_xMn_yO_2$, $LiNi_xCo_yO_2$, $LiNi_xMn_yO_2$, $LiNi_xCo_yMn_zO_2$, $LiCoO_2$, $LiNiO_2$, $LiMnO_2$, $LiFePO_4$, $LiCoPO_4$, $LiMnPO_4$, and $Li_4Ti_5O_{12}$; chalcogenides such as $Cu_2Mo_6S_8$, FeS, CoS and MiS; and oxides, sulfides, or halides such as scandium, ruthenium, titanium, vanadium, molybdenum, chromium, manganese, iron, cobalt, nickel, copper, zinc may be used, and more specifically, $TiS_2$, $ZrS_2$, $RuO_2$, $Co_3O_4$, $Mo_6S_8$, $V_2O_5$ etc. may be used, but the present invention is not limited thereto.

The shape of the positive electrode active material is not particularly limited, and may be a particle shape, for example, a spherical shape, an elliptical shape, a rectangular shape, or the like. The average particle diameter of the positive electrode active material may be, but is not limited thereto, within the range of 1 to 50 μm.

The average particle diameter of the positive electrode active material can be obtained, for example, by measuring the particle diameters of the active materials observed by a scanning electron microscope and calculating the average value thereof.

The binder contained in the positive electrode is not particularly limited, and fluorine-containing binders such as polyvinylidene fluoride (PVDF) and polytetrafluoroethylene (PTFE) can be used.

The content of the binder is not particularly limited as long as the positive electrode active material can be fixed thereby, and may be in the range of 0 to 10% by weight based on the entire positive electrode.

The positive electrode may additionally contain electrically conductive materials. The electrically conductive materials are not particularly limited as long as they can improve the electrical conductivity of the positive electrode, and examples thereof may include nickel powder, cobalt oxide, titanium oxide, and carbon. Examples of the carbon may include any one or one or more selected from the group consisting of Ketjen black, acetylene black, furnace black, graphite, carbon fiber, and fullerene.

In this case, the content of the electrically conductive materials may be selected in consideration of other conditions of the battery such as the type of the electrically conductive materials, and for example, may be in the range of 1 to 10% by weight with respect to the entire positive electrode.

Preparation of an all solid-state battery having the constitution as described above is not particularly limited in the present invention, but is possible through a known method.

As an example, the solid electrolyte is placed between the positive electrode and the negative electrode, followed by compression molding to assemble the cell. In addition, the first polymer electrolyte layer of the polymer electrolyte can be prepared by placing the electrolyte layer in contact with the positive electrode.

The assembled cell is placed in an exterior material and sealed by heat compression or the like.

Laminate packs made of aluminum, stainless steel, or the like, and cylindrical or square metal containers are very suitable as the exterior material.

Hereinafter, the present invention will be described in more detail with reference to examples and the like, but the scope and contents of the present invention are not to be construed as being reduced or limited by the following examples. In addition, it will be apparent to those skilled in the art, on the basis of the disclosure of the present invention, including the following examples, that the present invention which is not specifically presented with experimental results can be easily carried out, and that such variations and modifications fall within the scope of the appended claims.

Example: Synthesis of Solid Polymer Electrolyte

An electrolyte composition was prepared by charging polyethylene glycol diacrylate (PEGDA) or trimethylolpropane ethoxylate triacrylate (ETPTA) as a monomer for a multifunctional acrylate-based polymer, polyethylene oxide (PEO, Mw=600,000 to 1,000,000 g/mol) as a C1 to C10 polyalkylene oxide, LiTFSI as a lithium salt, methylsulfonylmethane ($DMSO_2$), sulforane, and combinations thereof as a non-aqueous solvent, and 2-hydroxy-2-methylpropiophenone (HOMPP) or phenylbis(2,4,6-trimethylbenzoyl) phosphine oxide (Irgacure 819) as a photo-initiator, and Nofia HM1100 (FRX polymer company, P content: 11 wt. %), which is a polyphosphonate-based polymer, as a flame-retardant polymer, under the conditions as described below, melting and stirring them at 60 to 120° C. for 24 hours.

The electrolyte composition was coated on a Teflon release film with a doctor blade and photo-polymerization was performed by applying ultraviolet rays. After completing the irradiation of ultraviolet rays, a solid polymer electrolyte in the form of a film was obtained from the Teflon release film.

Example 1

An electrolyte composition was prepared by charging 2.5 g of polyethylene glycol diacrylate (PEGDA) as a monomer for a multifunctional acrylate-based polymer, 0.15 g of polyethylene oxide (PEO, Mw=600,000 to 1,000,000 g/mol) as a C1 to C10 polyalkylene oxide, 1.14M of LiTFSI as a lithium salt, 5.0 g of methylsulfonylmethane ($DMSO_2$)/5.1 g of sulforane as a non-aqueous solvent, 0.07 g of phenylbis (2,4,6-trimethylbenzoyl)phosphine oxide (Irgacure 819) as a photo-initiator, and 1.0 g of Nofia HM1100 (FRX polymer company, P content: 11 wt. %), which is a polyphosphonate-based polymer, as a flame-retardant polymer, and stirring them at 120° C. for 24 hours.

The electrolyte composition was coated on a Teflon release film with a doctor blade and photo-polymerization was performed by applying ultraviolet rays. A solid polymer electrolyte in the form of a film was obtained from the Teflon release film. The irradiation of the ultraviolet rays was performed sequentially for 3 minutes at a wavelength of 325 nm, for 1 minute at a wavelength of 254 nm, and for 1 minute at a wavelength of 365 nm.

Example 2

An electrolyte composition was prepared by charging 10 g of trimethylolpropane ethoxylate triacrylate (ETPTA) as a monomer for a multifunctional acrylate-based polymer, 0.1 g of polyethylene oxide (PEO, Mw=600,000 to 1,000,000 g/mol) as a C1 to C10 polyalkylene oxide, 0.68 M of LiTFSI as a lithium salt, 12.6 g of methylsulfonylmethane ($DMSO_2$) as a non-aqueous solvent, 0.1 g of 2-hydroxy-2-methylpropiophenone (HOMPP) as a photo-initiator, and 1.0 g of Nofia HM1100 (FRX polymer company, P content: 11 wt. %), which is a polyphosphonate-based polymer, as a flame-retardant polymer, and stirring them at 60° C. for 24 hours.

The electrolyte composition was coated on a Teflon release film with a doctor blade and photo-polymerization was performed by applying ultraviolet rays. A solid polymer electrolyte in the form of a film was obtained from the Teflon release film. The irradiation of the ultraviolet rays was performed sequentially for 5 minutes at a wavelength of 325 nm, for 2.5 minutes at a wavelength of 254 nm, and for 2.5 minutes at a wavelength of 365 nm.

Example 3

An electrolyte composition was prepared by charging 10 g of trimethylolpropane ethoxylate triacrylate (ETPTA) as a monomer for a multifunctional acrylate-based polymer, 0.1 g of polyethylene oxide (PEO, Mw=600,000 to 1,000,000 g/mol) as a C1 to C10 polyalkylene oxide, 1.17 M of LiTFSI as a lithium salt, 12.6 g of methylsulfonylmethane ($DMSO_2$) as a non-aqueous solvent, 0.1 g of 2-hydroxy-2-methylpropiophenone (HOMPP) as a photo-initiator, and 1.0 g of Nofia HM1100 (FRX polymer company, P content: 11 wt. %), which is a polyphosphonate-based polymer, as a flame-retardant polymer, and stirring them at 60° C. for 24 hours.

The electrolyte composition was coated on a Teflon release film with a doctor blade and photo-polymerization was performed by applying ultraviolet rays. A solid polymer electrolyte in the form of a film was obtained from the Teflon release film. The irradiation of the ultraviolet rays was performed sequentially for 5 minutes at a wavelength of 325 nm, for 2.5 minutes at a wavelength of 254 nm, and for 2.5 minutes at a wavelength of 365 nm.

Example 4

An electrolyte composition was prepared by charging 2.22 g of trimethylolpropane ethoxylate triacrylate (ETPTA) as a monomer for a multifunctional acrylate-based polymer, 0.04 g of polyethylene oxide (PEO, Mw=600,000 to 1,000, 000 g/mol) as a C1 to C10 polyalkylene oxide, 0.47 M of LiTFSI as a lithium salt, 6.90 g of methylsulfonylmethane ($DMSO_2$) as a non-aqueous solvent, 0.02 g of 2-hydroxy-2-methylpropiophenone (HOMPP) as a photo-initiator, and 0.12 g of Nofia HM1100 (FRX polymer company, P content: 11 wt. %), which is a polyphosphonate-based polymer, as a flame-retardant polymer, and stirring them at 60° C. for 24 hours.

The electrolyte composition was coated on a Teflon release film with a doctor blade and photo-polymerization was performed by applying ultraviolet rays. A solid polymer electrolyte in the form of a film was obtained from the Teflon release film. The irradiation of the ultraviolet rays was performed sequentially for 5 minutes at a wavelength of 325 nm, for 2.5 minutes at a wavelength of 254 nm, and for 2.5 minutes at a wavelength of 365 nm.

Example 5

An electrolyte composition was prepared by charging 2.22 g of trimethylolpropane ethoxylate triacrylate (ETPTA) as a monomer for a multifunctional acrylate-based polymer, 0.04 g of polyethylene oxide (PEO, Mw=600,000 to 1,000, 000 g/mol) as a C1 to C10 polyalkylene oxide, 1.7 M of LiTFSI as a lithium salt, 6.90 g of methylsulfonylmethane ($DMSO_2$) as a non-aqueous solvent, 0.02 g of 2-hydroxy-2-methylpropiophenone (HOMPP) as a photo-initiator, and 0.12 g of Nofia HM1100 (FRX polymer company, P content: 11 wt. %), which is a polyphosphonate-based polymer, as a flame-retardant polymer, and stirring them at 60° C. for 24 hours.

The electrolyte composition was coated on a Teflon release film with a doctor blade and photo-polymerization was performed by applying ultraviolet rays. A solid polymer electrolyte in the form of a film was obtained from the Teflon release film. The irradiation of the ultraviolet rays was performed sequentially for 5 minutes at a wavelength of 325 nm, for 2.5 minutes at a wavelength of 254 nm, and for 2.5 minutes at a wavelength of 365 nm.

Example 6

An electrolyte composition was prepared by charging 3.33 g of trimethylolpropane ethoxylate triacrylate (ETPTA) as a monomer for a multifunctional acrylate-based polymer, 0.03 g of polyethylene oxide (PEO, Mw=600,000 to 1,000, 000 g/mol) as a C1 to C10 polyalkylene oxide, 1.0 M of LiTFSI as a lithium salt, 5.63 g of methylsulfonylmethane ($DMSO_2$) as a non-aqueous solvent, 0.03 g of 2-hydroxy-2-methylpropiophenone (HOMPP) as a photo-initiator, and 0.35 g of Nofia HM1100 (FRX polymer company, P content:

11 wt. %), which is a polyphosphonate-based polymer, as a flame-retardant polymer, and stirring them at 60° C. for 24 hours.

The electrolyte composition was coated on a Teflon release film with a doctor blade and photo-polymerization was performed by applying ultraviolet rays. A solid polymer electrolyte in the form of a film was obtained from the Teflon release film. The irradiation of the ultraviolet rays was performed sequentially for 5 minutes at a wavelength of 325 nm, for 2.5 minutes at a wavelength of 254 nm, and for 2.5 minutes at a wavelength of 365 nm.

Comparative Example: Synthesis of Solid Polymer Electrolyte

An electrolyte composition was prepared by charging 4.44 g of trimethylolpropane ethoxylate triacrylate (ETPTA) as a monomer for a multifunctional acrylate-based polymer, 0.08 g of polyethylene oxide (PEO, Mw=600,000 to 1,000,000 g/mol) as a C1 to C10 polyalkylene oxide, 1.05 M of LiTFSI as a lithium salt, 5.07 g of methylsulfonylmethane (DMSO$_2$)/5.07 g of sulforane as a non-aqueous solvent, and 0.05 g of 2-hydroxy-2-methylpropiophenone (HOMPP) as a photo-initiator, and stirring them at 120° C. for 24 hours.

The electrolyte composition was coated on a Teflon release film with a doctor blade and photo-polymerization was performed by applying ultraviolet rays. A solid polymer electrolyte in the form of a film was obtained from the Teflon release film. The irradiation of the ultraviolet rays was performed sequentially for 3 minutes at a wavelength of 325 nm, for 1 minute at a wavelength of 254 nm, and for 1 minute at a wavelength of 365 nm.

Example 1 shows stable properties at high voltage of 5.0 V or more even though it contains the flame-retardant polymer.

Experimental Example 2: Evaluation of Ion Conductivity and Mechanical Strength

The ion conductivity of the electrolytes prepared in Examples 1 to 6 and Comparative Example was measured using the following Equation 1 after measuring their impedance.

Film samples of the polymer solid electrolyte having a constant width and thickness were prepared for the measurement. After contacting a SUS substrate having excellent electronic conductivity as an ion blocking electrode on both sides of the plate-shaped sample, an alternating voltage was applied through the electrodes on both sides of the sample. At this time, as an applied condition, the measurement frequency was set in an amplitude range of 1.0 MHz to 0.1 Hz, and impedance was measured using a BioLogic company VMP3. The bulk electrolyte resistance is obtained from the intersection point ($R_b$), where the measured semicircle or straight line of the impedance trajectory meets the real axis, and the ion conductivity of the membrane of the polymer solid electrolyte is calculated from the width and thickness of the sample, and the results are shown in Table 3 below according to the concentration of the lithium salt and the content of the solids.

$$\sigma(S \cdot cm^{-1}) = \frac{1}{R_b} \frac{t}{A} \qquad \text{[Equation 1]}$$

TABLE 2

| | Multifunctional acrylate-based polymer (g) | PEO (g) | LiTFSI (g) | Non-aqueous solvent (g) | Photo-initiator (g) | Flame-retardant polymer (g) |
|---|---|---|---|---|---|---|
| Comparative Example | 4.44 (ETPTA) | 0.08 | 4.55 | D2 5.07: SL 5.07 mixture | 0.05 (HOMPP) | — |
| Example 1 | 2.50 (PEGDA) | 0.15 | 4.50 | D2 5.0: SL 5.1 mixture | 0.07 (IRGACURE 819) | 1.00 |
| Example 2 | 10.0 (ETPTA) | 0.1 | 4.50 | D2 12.6 | 0.1 (HOMPP) | 1.00 |
| Example 3 | 10.0 (ETPTA) | 0.1 | 9.10 | D2 12.6 | 0.1 (HOMPP) | 1.00 |
| Example 4 | 2.22 (ETPTA) | 0.04 | 1.15 | D2 6.90 | 0.02 (HOMPP) | 0.12 |
| Example 5 | 2.22 (ETPTA) | 0.04 | 4.15 | D2 6.90 | 0.02 (HOMPP) | 0.12 |
| Example 6 | 3.33 (ETPTA) | 0.03 | 2.88 | D2 5.63 | 0.03 (HOMPP) | 0.35 |

(* Abbreviated as methylsulfonylmethane (D2) and sulforane (SL) in the non-aqueous solvent in the table above).

Experimental Example 1: Evaluation of Voltage Stability

The linear sweep voltammetry (LSV) using BioLogic company VMP3 was used to evaluate the voltage stability of the solid polymer electrolytes prepared in Example 1 and Comparative Example. One side of the electrolytes of Example and the comparative example was in contact with the lithium metal electrode and the other side was in contact with the SUS substrate to produce a coin cell. The voltage stability was measured in the range of 1.5V-6.0V at a sweep speed of 10 mV/s.

Figure 1:
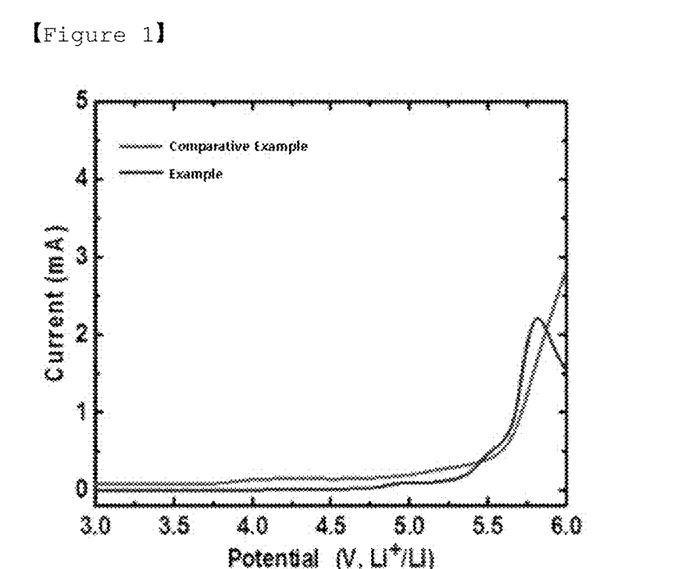
FIG. 1 shows a graph of the voltage stabilities of the electrolytes according to examples of the present invention and comparative example.

As shown in FIG. 1, it was confirmed that compared with the electrolyte of the comparative example, the electrolyte of σ: Ion conductivity
$R_b$: Intersection point with real number axis of impedance trajectory
A: Area of sample
t: Thickness of sample.

The mechanical strengths of the electrolytes prepared in Examples 1 to 6 and Comparative Example were checked whether or not to maintain the shape of the film of the solid electrolyte and were shown in Table 3 below.

Referring to Table 3 below, it was confirmed that in Examples 2 and 3, the content of the multifunctional acrylate-based polymer was increased from 20 wt. % in Example 1 to 30 to 35 wt. % to improve the mechanical strength of the electrolyte, thereby maintaining the shape of the film of the solid electrolyte. However, as the content of the multifunctional acrylate-based polymer was increased, the ion conductivity was decreased to ⅙ to ¹/₁₂ level relative to the electrolyte of Example 1, which indicates that the improvement of the mechanical strength of the electrolyte interfered with the mobility of lithium ions. In the case of Example 3 in which twice the amount of lithium salt included in Example 2 was added to improve the ion conductivity, it was 2 seconds without being burned by the flame, and thus shows excellent flame retardancy by including the flame-retardant polymer (0: excellent flame retardancy, x: no flame retardancy).

The results of the experiments according to the comparative example and the examples are summarized in Table 3 below.

TABLE 3

|  | Polymer (wt. %) ETPTA/PEO | LiTFSI (wt. %) (M) | Content of the solids (wt. %) | Ion conductivity (mS/cm, 5° C.) | Voltage stability (V) | Flame-retardant* | Mechanical strength** |
|---|---|---|---|---|---|---|---|
| Comparative Example | 23.5 | 23.7 (1.05M) | 73.6 | 0.24 | >5.0 | X | crushed |
| Example 1 | 20.0 | 24.7 (1.14M) | 72.1 | 0.30 | >5.0 | ◯ | crushed |
| Example 2 | 35.8 | 16.0 (0.68M) | 55.3 | 0.057 | 4.5 | ◯ | maintenance of form |
| Example 3 | 30.8 | 27.7 (1.17M) | 61.6 | 0.025 | 4.7 | ◯ | maintenance of form |
| Example 4 | 21.6 | 10.6 (0.47M) | 34.0 | 0.65 | — | ◯ | torn |
| Example 5 | 16.8 | 30.9 (1.70M) | 48.7 | 0.15 | — | ◯ | torn |
| Example 6 | 27.4 | 23.5 (1.00M) | 54.0 | 0.11 | 4.5 | ◯ | maintenance of form |

(*◯: Self-burning after 2 seconds,
**Confirmation of morphology of solid electrolyte film after decomposition of coin cell).

confirmed that excess lithium ions could not be dissociated in the electrolyte, thus rather decreasing the ion conductivity.

Next, in Examples 4 and 5, the solid content was reduced to 30 to 50 wt. % and the content of the multifunctional acrylate-based polymer was reduced to 15 to 22 wt. % to secure the ion conductivity of the electrolyte, but it was confirmed that the mechanical strength of the electrolyte is reduced by confirming that the film of the solid electrolyte separated from the coin cell is torn. In the case of Example 5, lithium salt was added 3.6 times more than Example 4, but it was confirmed that the ion conductivity is rather reduced.

Figure 2:
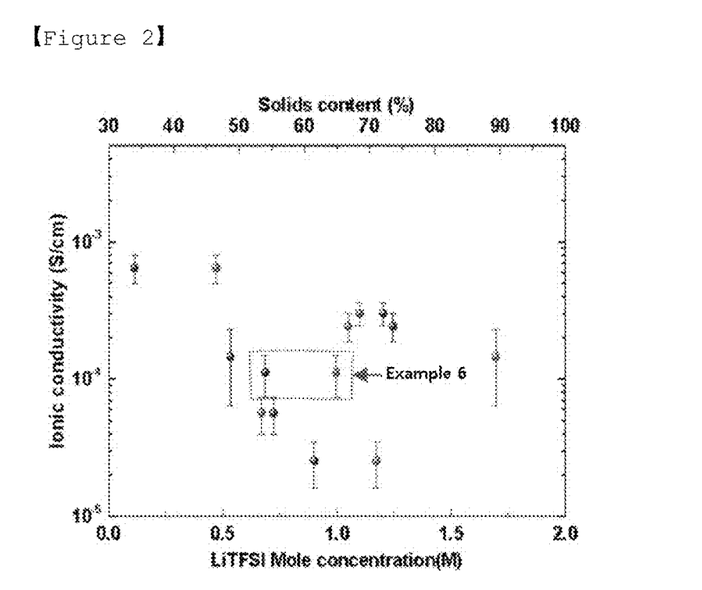
FIG. 2 shows a graph comparing the ion conductivities of the electrolytes according to examples of the present invention and comparative example.

As shown in FIG. 2, in the case of Example 6 where the content of the multifunctional acrylate-based polymer was maintained at a level of 22 to 30 wt. %, the concentration of lithium salt was maintained at a level of 1 M, and the solid content was maintained at a level of 54 wt. %, it was confirmed that excellent ion conductivity, voltage stability, and flame-retardant properties are shown while maintaining the mechanical strength of the solid electrolyte.

Experimental Example 3: Experiment of Flame-Retardant Characteristic

Figure 3:
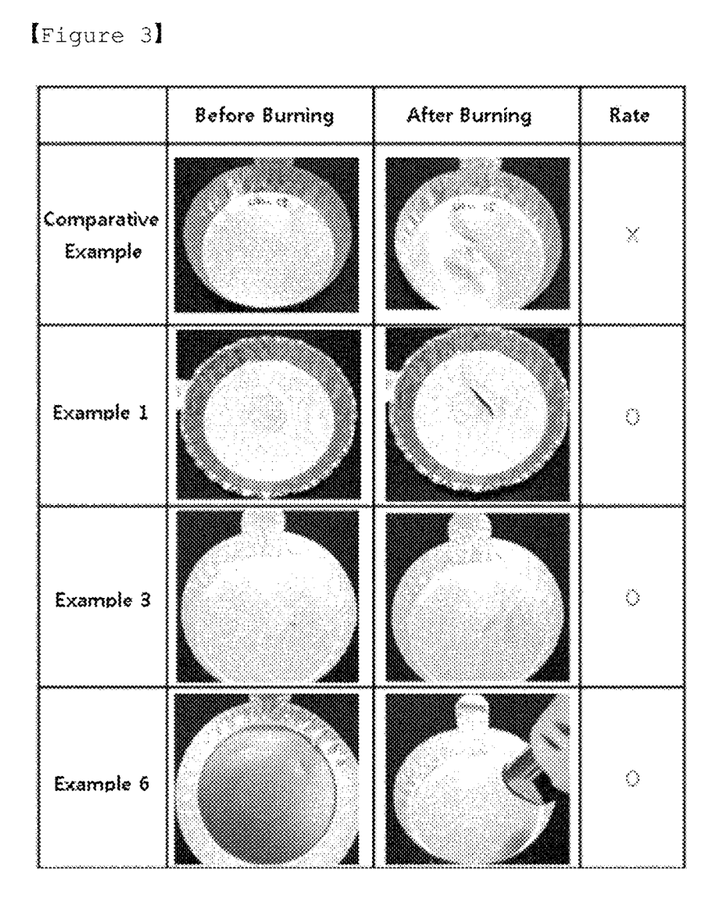
FIG. 3 is an image comparing the flame-retardant properties of the electrolytes according to examples of the present invention and comparative example.
Figure 4:
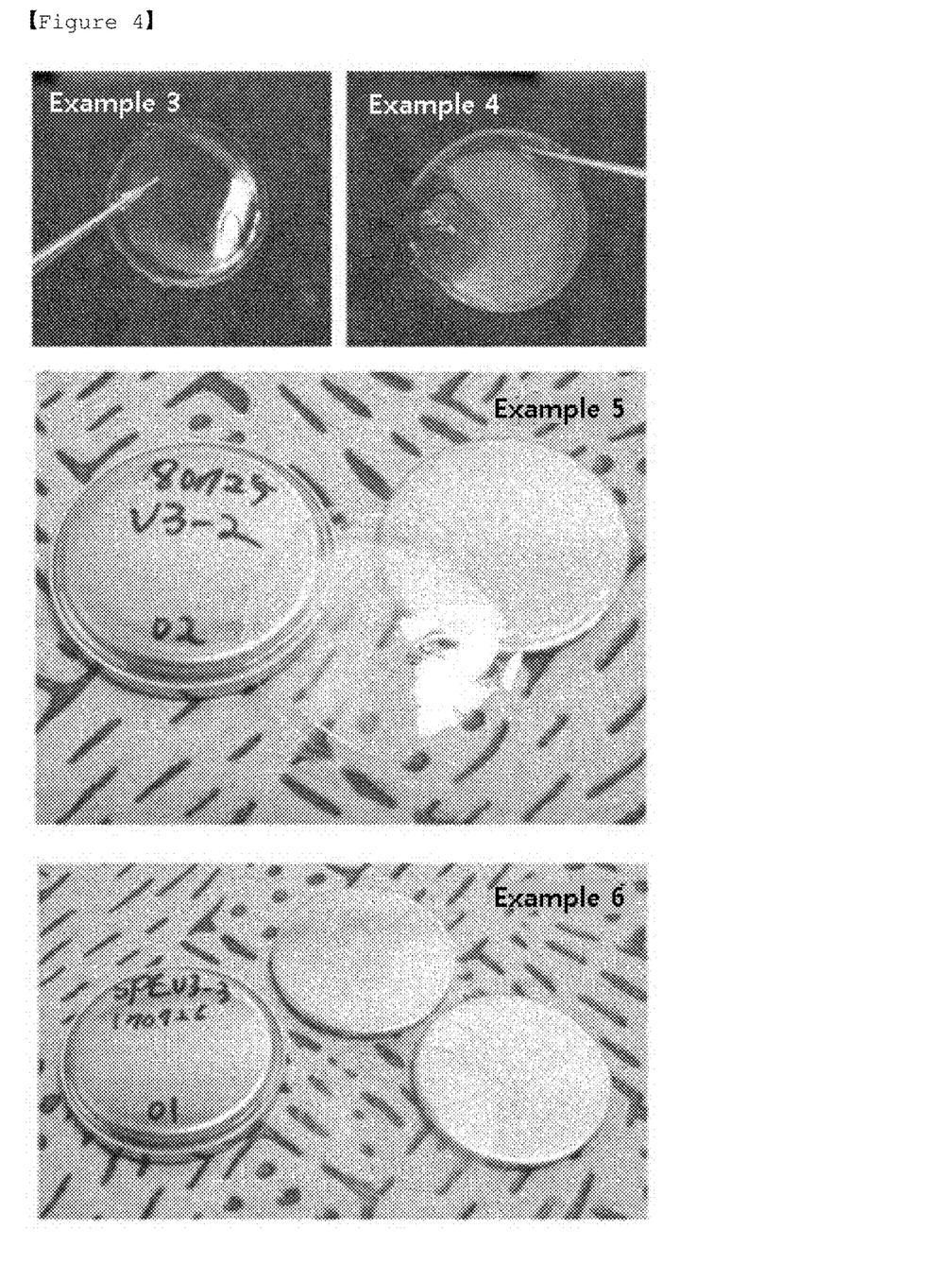
FIG. 4 shows an image of the measurements of the mechanical strength of the electrolytes according to examples of the present invention and comparative example.

In order to confirm the flame-retardant characteristics of the electrolytes according to the present invention, samples of each component and circular samples having a diameter of 2 cm of the electrolytes prepared according to the comparative example and the examples were prepared. Each sample was burned using a torch and the results were checked for the flame-retardant characteristics. FIG. 3 is a result showing the flame-retardant characteristics of the electrolytes prepared according to the comparative example and the examples.

Referring to FIG. 3, it was confirmed that the polymer electrolyte according to the present invention exhibits self-extinguishing property that the flame is extinguished within

The invention claimed is:

1. A solid polymer electrolyte comprising:
a multifunctional acrylate-based polymer;
a C1 to C10 polyalkylene oxide;
a flame-retardant polymer;
a lithium salt; and
a non-aqueous solvent,
wherein the non-aqueous solvent is present in a solid state at room temperature,
wherein the non-aqueous solvent is dimethyl sulfone,
wherein the multifunctional acrylate-based polymer and the polyalkylene oxide form semi-interpenetrating polymer networks (semi-IPN), and the flame-retardant polymer is present blended with the semi-interpenetrating polymer networks, and
wherein 50% by weight or more of solids of the solid polymer electrolyte comprises the multifunctional acrylate-based polymer, the C1 to C10 polyalkylene oxide, the flame-retardant polymer, the lithium salt, and the non-aqueous solvent based on a total weight of the solid polymer electrolyte.

2. The solid polymer electrolyte according to claim 1, wherein the C1 to C10 polyalkylene oxide is present in an amount of 0.1 parts by weight to 10 parts by weight relative to 100 parts by weight of the multifunctional acrylate-based polymer.

3. The solid polymer electrolyte according to claim 2, wherein a weight average molecular weight of the C1 to C10 polyalkylene oxide is 1,000 g/mol to 1,000,000 g/mol.

4. The solid polymer electrolyte according to claim 1, wherein the multifunctional acrylate-based polymer comprises at least one monomer-derived polymerized unit selected from the group consisting of trimethylolpropane ethoxylate triacrylate, trimethylolpropane propoxylate triacrylate, polyethylene glycol dimethacrylate, polyethylene glycol diacrylate, polyester dimethacrylate, trimethylolpropane trimethacrylate, ethoxylated bis phenol A dimethacrylate, tetraethylene glycol diacrylate, 1,4-butanediol diacrylate, 1,6-hexandiol diacrylate, ditrimethylolpropane tetraacrylate, pentaerythritol tetraacrylate, pentaerythritol ethoxylate tetraacrylate, dipentaerythritol pentaacrylate, and dipentaerythritol hexaacrylate.

5. The solid polymer electrolyte according to claim 1, wherein the C1 to C10 polyalkylene oxide comprises at least one selected from the group consisting of polyethylene oxide, and polypropylene oxide.

6. The solid polymer electrolyte according to claim 1, wherein 25 wt. % to 40 wt. % of the semi-interpenetrating polymer networks is present, based on a total weight of the solid polymer electrolyte.

7. The solid polymer electrolyte according to claim 1, wherein the lithium salt comprises at least one selected from the group consisting of $LiPF_6$, $LiBF_4$, $LiSbF_6$, $LiAsF_6$, LiOH, $LiOH \cdot H_2O$, LiBOB, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, and LiFSI.

8. The solid polymer electrolyte according to claim 1, wherein the lithium salt is present in an amount of 10 parts by weight to 50 parts by weight relative to 100 parts by weight of the solid polymer electrolyte.

9. The solid polymer electrolyte according to claim 1, wherein the lithium salt is present in a concentration of 0.5 M to 2.5 M with respect to the non-aqueous solvent.

10. The solid polymer electrolyte according to claim 1, wherein a thickness of the solid polymer electrolyte is 10 μm to 300 μm.

11. The solid polymer electrolyte according to claim 1, wherein an ion conductivity of the solid polymer electrolyte is $1.0 \times 10^{-5}$ S/cm to $1.0 \times 10^{-3}$ S/cm based on 25° C.

12. The solid polymer electrolyte according to claim 1, wherein the flame-retardant polymer comprises at least one selected from the group consisting of polyphosphonate, polyphosphonate oligomer, poly(phosphonate-co-carbonate), and poly(phosphonate-co-carbonate)oligomer.

13. The solid polymer electrolyte according to claim 1, wherein 50 wt. % to 70 wt. % of solids of the solid polymer electrolyte comprises the multifunctional acrylate-based polymer, the C1 to C10 polyalkylene oxide, the flame-retardant polymer, the lithium salt, and the non-aqueous solvent based on a total weight of the solid polymer electrolyte.

14. The solid polymer electrolyte according to claim 13, wherein the lithium salt is present in a concentration of 0.5 M to 1.5 M with respect to the non-aqueous solvent.

15. A method for preparing the solid polymer electrolyte according to claim 1 comprising the steps of:
  (1) mixing an electrolyte composition containing the multifunctional acrylate-based polymer monomer, the C1 to C10 polyalkylene oxide, the flame-retardant polymer, the lithium salt, and the non-aqueous solvent;
  (2) melting the mixed electrolyte composition at a temperature of 100° C. to 150° C.; and
  (3) photo-polymerizing the molten electrolyte composition to obtain the solid polymer electrolyte.

16. The method for preparing the solid polymer electrolyte according to claim 15, wherein in step (1), at least one photo-initiator selected from the group consisting of 2,2-dimethoxy-2-phenylacetonephenone (DMPA), 2-hydroxy-2-methylpropiophenone (HOMPP), lithium phenyl-2,4,6-trimethylbenzoylphosphinate (LAP), phenylbis(2,4,6-trimethylbenzoyl) phosphine oxide (IRGACURE 819) and 1-[4-(2-Hydroxyethoxy)-phenyl]-2-hydroxy-2-methyl-1-propane-1-one (IRGACURE 2959), is added.

17. An all solid-state battery comprising the solid polymer electrolyte according to claim 1.

\* \* \* \* \*